Sept. 8, 1970

P. A. GUINARD 3,527,465

ROTARY PACKING FOR USE IN ROTARY MACHINES
AND MORE PARTICULARLY IN PUMPS

Filed Oct. 16, 1967

PAUL ANDRÉ GUINARD,
INVENTOR

3,527,465
Patented Sept. 8, 1970

3,527,465
ROTARY PACKING FOR USE IN ROTARY MACHINES AND MORE PARTICULARLY IN PUMPS

Paul André Guinard, Saint-Cloud, France, assignor to Etablissements Pompes Guinard, Societe Anonyme, Saint-Cloud, France, a company of France
Filed Oct. 16, 1967, Ser. No. 675,627
Claims priority, application France, Oct. 28, 1966, 81,930
Int. Cl. F16j *15/42, 15/40, 15/54*
U.S. Cl. 277—27      4 Claims

ABSTRACT OF THE DISCLOSURE

A rotary packing for use in rotary machines and more particularly but not exclusively in pumps, compressors and the like comprising a rotary and a stationary bush in which at least one of the faces of one of the bushes contains at least one spiral feed passage extending from the marginal edge, exposed to a pressure, to at least one injection passage situated substantially in the vicinity of an equilibrium diameter to control the leakage of liquid from between the bushes.

---

The present invention relates to rotary packings with leakage regulation means used on rotary machines and more particularly on pumps, compressors and the like.

These rotary packings comprise a stationary bush and a mobile bush to which rotary motion is imparted by a drive shaft. For a rotary packing to function properly, it is necessary that there should be a film of liquid between the contacting bush faces, to prevent deterioration thereof. Owing to the possible pressure fluctuations arising and to the very high pressures used nowadays, it is necessary to control the thickness of this film and hence the value of the leakage, so that it remains substantially constant and at as low a value as possible compatible with proper functioning.

Difficulty has been experienced in controlling the pressure balance and leakage. Devices to take up play are somewhat complicated and expensive, and these devices affect the axial position of the stationary bush in relation to the rotary bush.

It is an object of the present invention to provide a rotary packing with leakage regulation means which remains perfectly balanced as time passes, notwithstanding wear on the packing faces and irrespective of impurities in the liquid under pressure.

SUBJECT MATTER OF THE INVENTION

The rotary packing for use in rotary machines and more particularly but not exclusively in pumps, compressors and the like, comprises a rotary and stationary bush in which at least one of the faces of one of the bushes contains at least one spiral feed passage extending from the marginal edge, exposed to a pressure, to at least one injection passage situated substantially in the vicinity of an equilibrium diameter, to control the leakage of liquid from between the bushes.

In one embodiment of the invention, the cross-sectional area of each feed passage remains constant or varies according to its distance from the marginal edge exposed to the pressure, so that the pressure drop of any section of this passage is generally equal to the lamination existing between the faces of the bushes over the shortest distance separating that section from the marginal edge.

The invention will be further described, by way of example only, with reference to the accompanying drawings, in which.

Figure 1:
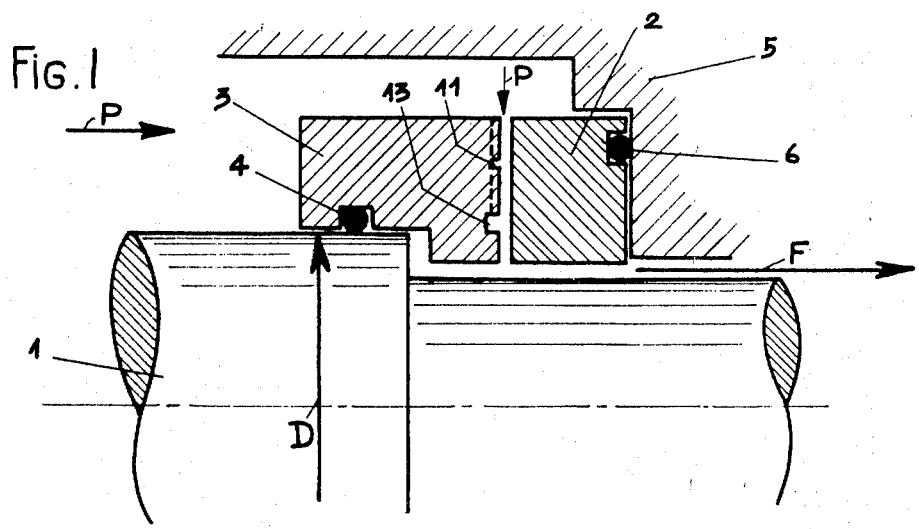
FIG. 1 is a longitudinal sectional view of part of an improved rotary packing with leakage regulation means according to the invention.
Figure 2:
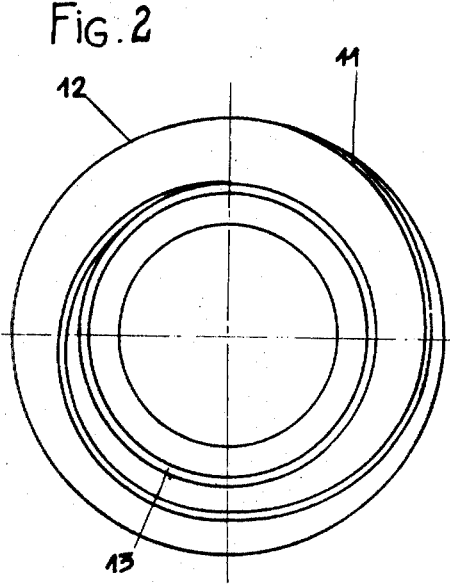
FIG. 2 shows an end view of the active face of one possible form of the rotary bush.
Figure 3:
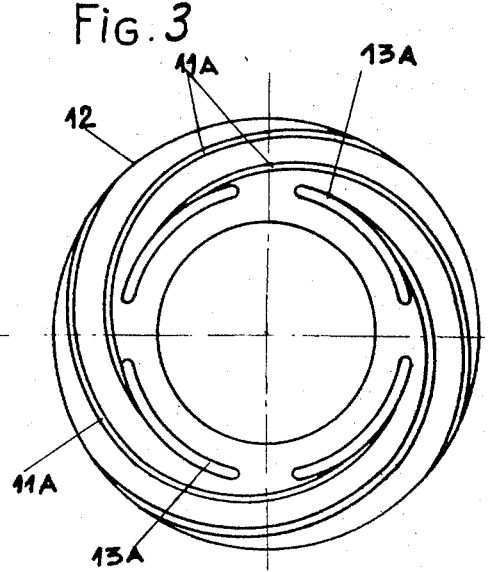
FIG. 3 is a similar view to FIG. 2 of an alternative form of active face.

According to the invention, as shown more particularly in FIGS. 1 and 2, the active side face of the rotary bush 3 contains a spiral feed passage, 11, extending from the outer marginal edge 12, which is exposed to the pressure, to a circular injection groove, 13, provided at the equilibrium diameter D. FIG. 3 shows an alternative form, in which the groove 13 is replaced by arcuate grooves 13A, each arcuate groove being fed by a feed passage 11A.

Figure 4:
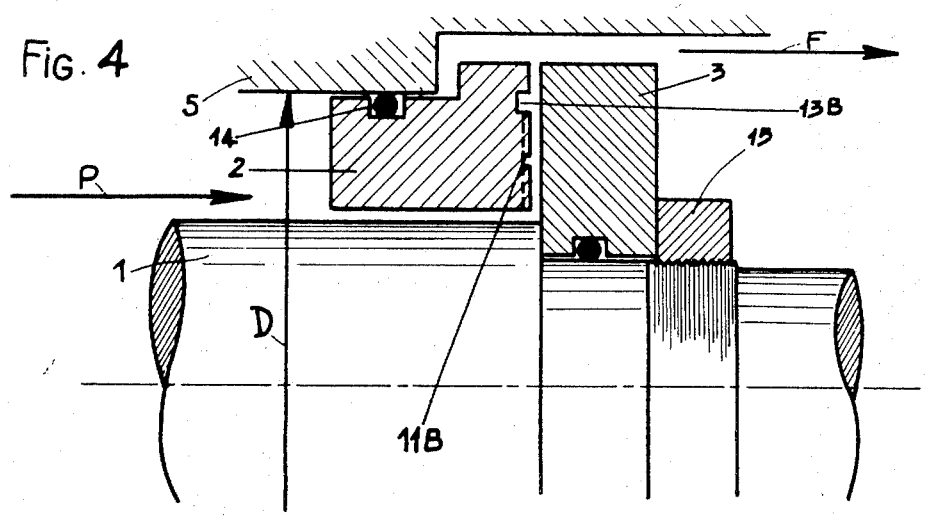
FIG. 4 is a longitudinal sectional view of part of another embodiment of a rotary packing according to the invention.
Figure 5:
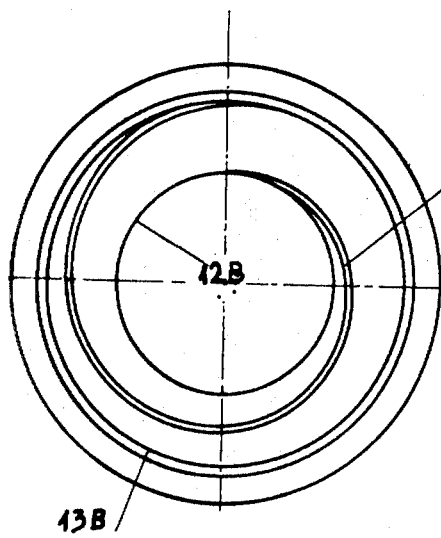
FIG. 5 shows an end view of the active face of one possible form for the stationary bush shown in FIG. 4.
Figure 6:
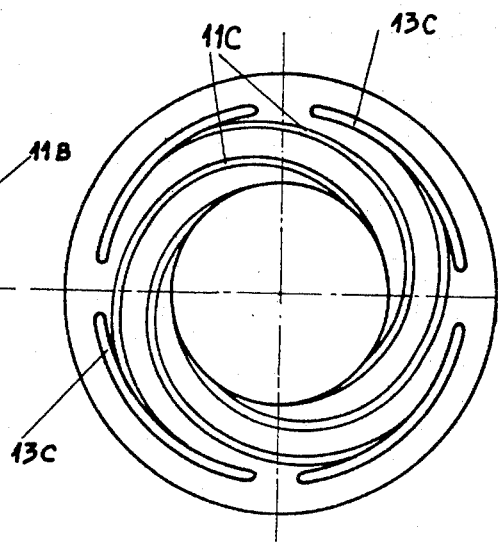
FIG. 6 shows a view similar to FIG. 5 of an alternative form of stationary bush.

FIG. 4 illustrates another example, in which the bush 2, designated the stationary bush, is mounted not only floating, as in the other examples, but also slidable on the fixed support 5, being sealed by a toroidal packing, 14. The rotary bush 3, instead of being mounted so as to slide on the shaft 1, is locked to it by a nut, 15. In this example, the bush which is subjected to the pressure P, leakage being indicated by the arrow F, contains the injection groove 13B fed by the passage 11B, which extends from the groove 13B to the inner marginal edge 12B, exposed to the pressure P. The injection groove 13B is situated at the equilibrium diameter D which is the same as the diameter of the cylindrical surface over which the axially slidable bush can slide (see FIGS. 1 and 5). FIG. 8 shows an alternative form of stationary bush, in which, as in FIG. 3, the circular injection groove has been replaced by arcuate grooves 13C, fed by the passages 11C.

The mode of operation of the improved rotary packings hereinbefore described is as follows:

With a fluid of constant viscosity and density, at a given pressure against which a seal is to be provided, the resultant of the forces acting on the bush is nil for a given spacing between the contacting bush faces. These forces, of a hydrostatic nature, are in fact:

(1) A force of repulsion tending to push the faces apart, its value depending on the pressure distribution over the entire face. This pressure distribution, which assumes a symmetrical revolution about the longitudinal centre line of the drive shaft, depends on the pressure in the injection groove. For any given profile and shape of the feed passage, the injection pressure depends only on the spacing between the bush faces.

(2) A balancing force opposed to the above force, derived from the action of the pump delivery pressure on the outer face of the rotary bush. For certain ranges of values of equilibrium and injection diameters D, the system is stable. This is because, if the system is operating with a given spacing between the bush faces, an external disturbance tends to alter this spacing. If this spacing increases, the pressure in the injection groove falls and the force of repulsion is reduced. As the balancing force is unaltered, the system returns to its original spacing. Conversely, if the spacing is reduced, the pressure in the injection passage rises and the force of repulsion is increased. As the balancing force is unaltered, the system returns to its original spacing. The diameter D of the groove 13, or 13A, or 13B, respectively, at which the self-balancing effect obtains is the equilibrium diameter.

Figure 7:
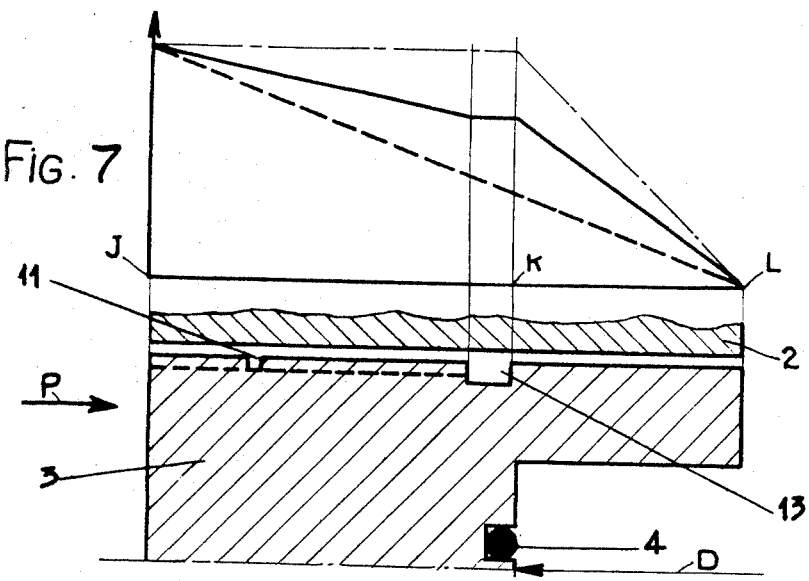
FIG. 7 shows in diagrammatic form the practical effect of the improved rotary packings according to the invention.

FIG. 7 shows a diagram of the distribution of pressure between the bush faces for different spacing values.

The operational spacing of the bushes, in point of fact, lies between near-zero spacing and very-high spacing. For near-zero spacing, the leakage rate is very low and the pressure drop in the passage is at its minimum. In practice, the pressure in the injection groove is equal to the static pump delivery pressure and the pressure drop which occurs between the points K and L of the diagram where the mean gradient of the pressure drop is at its maximum. Conversely, for very-high spacing, the leakage rate of the passage is very low in relation to the rate of flow between faces. Part of the pressure drop occurs between the points J and K of the diagram, where the mean value of the pressure drop is at its minimum.

The curve drawn in chain dotted line represents conditions for a spacing reduced to the minimum possible between the faces of the bushes in the rotary packing. The curve in dotted line shows the pressure values for very-high spacing and the curve in solid line corresponds to normal operating spacing.

In the preparation of this diagram, the high pressure P has been assumed to act on the outside diameter of the bush.

The developed length of the groove can be increased to a value such as to make it possible to machine a profile of dimensions such that they can be machined by conventional means;
they do not require very close tolerances for machining;
they are little affected by fouling or erosion;
they are little affected by blockage;
they are little subject to face wear.

Moreover, the faces of the bushes are automatically cleaned in the event of the introduction of foreign particles, by virtue of the spiral feed passage.

In order not to upset the symmetrical revolution of the flow, the cross-sectional area and shape of the passage defined in the family of curves are such that:

for a constant flow in the passage, the pressure drop over a portion of the curve lying between the high-pressure diameter and any given diameter is proportional to the pressure drop due to lamination between the constant-flow faces between the same two diameters.

What I claim is:

1. Rotary seal with controlled leakage, for rotary machines, more particularly for pump, compressors and the like comprising a first bush (3) rotating with the shaft of the pump;
   a second non-rotating bush (2);
   said first and second bushes being located co-axially adjacent each other and having a generally cylindrical annular form, each having inner and outer cylindrical surfaces and side faces, one of said bushes being movably axially, the upstream side face of one of said bushes being subjected to the pressure of the pumped fluid, the adjacent side faces of said bushes defining a leakage gap;
   a sliding packing ring (4) arranged between one of the cylindrical surfaces of said axially movable bush and the part of the machine with which it is non-rotatably related, the diameter of said cylindrical surface being the equilibrium diameter of the axially slidable bush, the other cylindrical axially movable bush being formed with a passage for the pumped fluid to enter the gap existing between said both bushes, thus forming a leakage path in which the pressure of fluid balances the pressure acting upon the upstream side face of the axially movable bush;
   at least one injection recess (13) arranged on one of the adjacent side faces of said bushes defining said leakage path, said recess being located in the vicinity of the equilibrium diameter of the axially movable bush;
   and at least one feed passage (11) formed by an essentially spiral groove arranged on the same face of the bush as the injection recess (13) and extending from the passage for the fluid adjacent the other cylindrical surface and subjected to the pressure of the pumped fluid, and opening into said injection recess (13).

2. A rotary seal with controlled leakage according to claim 1, in which the injection recess (13) is a circular groove.

3. A rotary seal with controlled leakage according to claim 1, in which a plurality of arc shaped injection recesses (FIG. 8: 13C) are provided on said face of said bush and a plurality of substantially spiral shaped feeding grooves (11C) open into said recesses respectively.

4. A rotary seal with controlled leakage as claimed in claim 1, in which the cross sectional area of the feed passages varies with the distance from the passage adjacent said other cylindrical surface exposed to the pressure, so that the pressure drop in any section of these passages is substantially equal to the pressure drop occurring between opposed faces defining said gap over the radial distance separating the respective section from the outer cylindrical surface.

References Cited

UNITED STATES PATENTS

| 2,087,313 | 7/1937  | Bigelow et al. | 277—27 |
| 3,085,808 | 4/1963  | Williams       | 277—27 |
| 3,109,658 | 11/1963 | Barrett et al. | 277—3  |
| 3,347,552 | 10/1967 | Frisch         | 277—27 |
| 3,421,768 | 1/1969  | Ludwig         | 277—25 |

FOREIGN PATENTS

| 1,012,085 | 12/1965 | Great Britain. |
| 1,009,940 | 11/1965 | Great Britain. |

SAMUEL ROTHBERG, Primary Examiner

U.S. Cl. X.R.

277—74, 96